(12) United States Patent
Terasaka et al.

(10) Patent No.: US 7,188,256 B2
(45) Date of Patent: Mar. 6, 2007

(54) RECORDING MEDIUM HAVING ENCRYPTED SOUND DATA RECORDED THEREIN AND INFORMATION PROCESSOR

(75) Inventors: Isamu Terasaka, Tokyo (JP); Hiroshi Yamamoto, Tokyo (JP); Toshimitsu Ohdaira, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 1054 days.

(21) Appl. No.: 09/812,726

(22) Filed: Mar. 20, 2001

(65) Prior Publication Data

US 2001/0049792 A1    Dec. 6, 2001

(30) Foreign Application Priority Data

Mar. 22, 2000    (JP) ............................. 2000-080304

(51) Int. Cl.
*H04L 9/32* (2006.01)
*H04N 7/167* (2006.01)

(52) U.S. Cl. .................... 713/193; 380/201; 726/26

(58) Field of Classification Search ........ 713/192–194, 713/189, 200; 380/200–203, 217, 227; 705/51, 705/52, 57–58; 726/26–27, 31
See application file for complete search history.

(56) References Cited

U.S. PATENT DOCUMENTS 5,509,070 A * 4/1996 Schull ........................ 705/54
5,563,947 A * 10/1996 Kikinis ....................... 705/51
5,596,639 A * 1/1997 Kikinis ....................... 705/52
5,761,302 A * 6/1998 Park .......................... 380/201
5,808,987 A * 9/1998 Oda et al. .................. 369/47.2
6,141,681 A * 10/2000 Kyle ......................... 709/206
6,587,948 B1 * 7/2003 Inazawa et al. ............ 713/193
6,735,311 B1 * 5/2004 Rump et al. ................ 380/231

FOREIGN PATENT DOCUMENTS

| JP | 05-233460 | 9/1993 |
| JP | 07-021688 | 1/1995 |
| JP | 09-017119 | 1/1997 |
| JP | 10-207808 | 8/1998 |
| JP | 11-088322 | 3/1999 |
| JP | 11-096675 | 4/1999 |
| JP | 11-191266 | 7/1999 |
| JP | 11-339390 | 12/1999 |
| JP | 2000-252974 | 9/2000 |

* cited by examiner

*Primary Examiner*—Hosuk Song
(74) *Attorney, Agent, or Firm*—Katten Muchin Rosenman LLP

(57) ABSTRACT

Digital sound data is encrypted and recorded in a recording medium 200. Information 212 required for decoding the encrypted digital sound data 220 is recorded in a program 211 for controlling the reproduction of sound data separately from the digital sound data 220. This can prevent PCM sound data recorded in the recording medium as a part of a content, from being reproduced separately from the content.

4 Claims, 3 Drawing Sheets

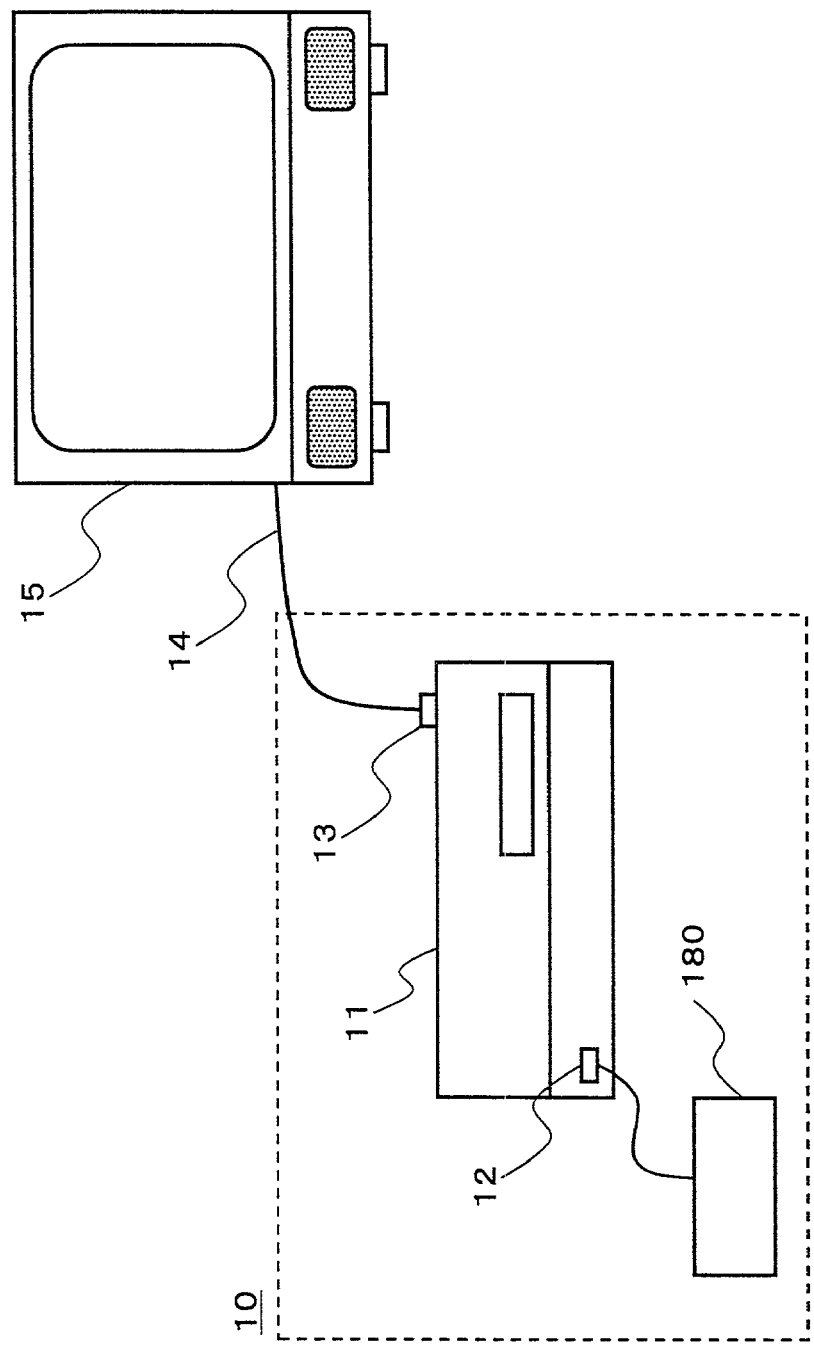

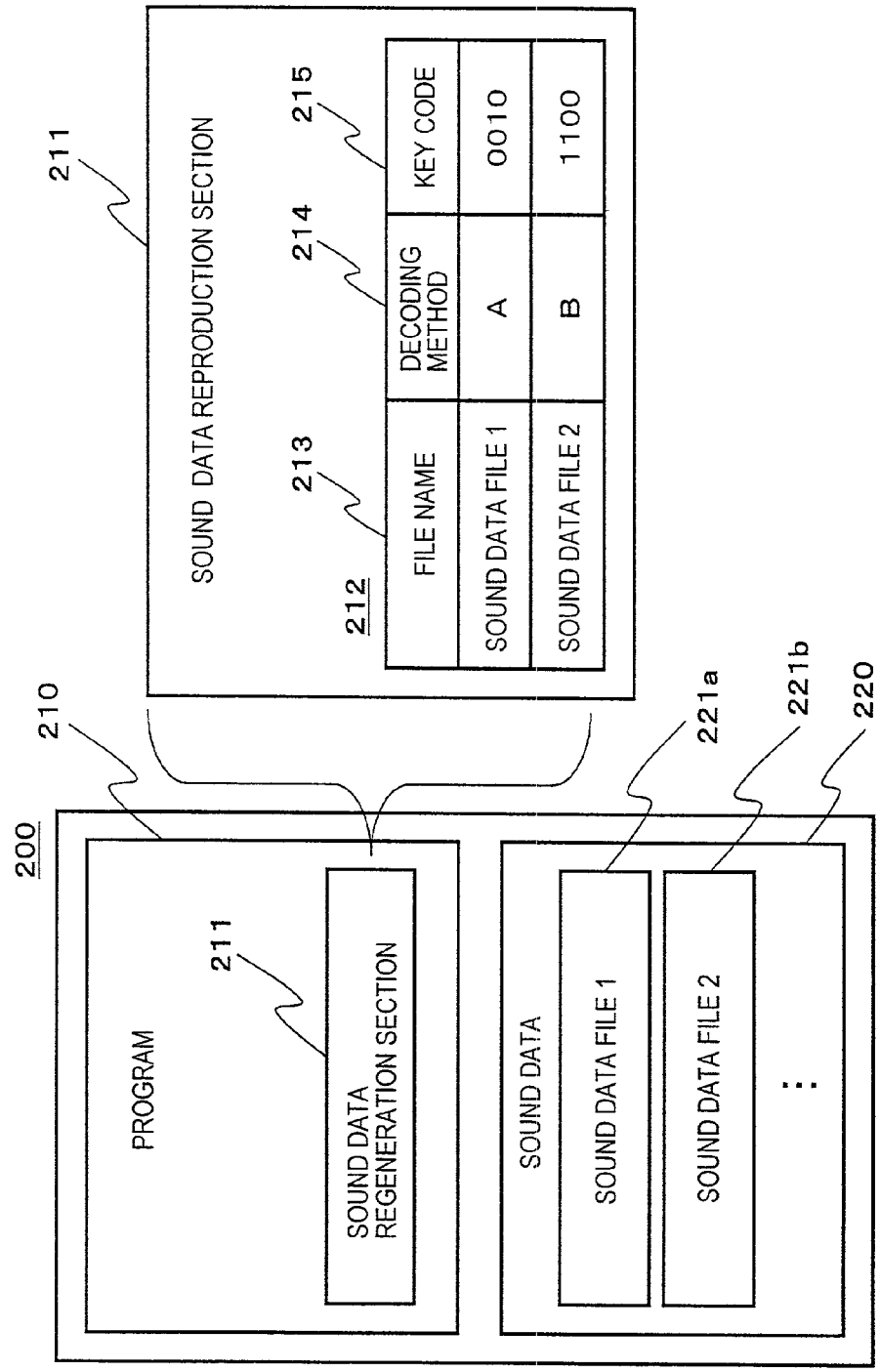

RECORDING MEDIUM HAVING ENCRYPTED SOUND DATA RECORDED THEREIN AND INFORMATION PROCESSOR

This application claims a priority based on Japanese Patent Application No. 2000-80304 filed on Mar. 22, 2000, the entire contents of which are incorporated herein by reference all purposes.

BACKGROUND OF THE INVENTION

1. Field of the Invention

The present invention relates to a technique for recording digital sound data in a recording medium and more particularly to a technique for recording the digital sound data in the recording medium after encrypting the data.

2. Description of the Related Art

There are many cases in which sound data such as a thematic music, a background music, or the like is recorded in an optical disk, for example, a CD-ROM used as a medium for supplying a game content or a multimedia content to be performed by an entertainment apparatus or the like together with a game program or image data. Usually, such sound data are digitized as PCM (Pulse Code Modulation) data.

Taking a game content as an example, the above-described sound data is stored in association with a game program to be performed by an entertainment apparatus and constitutes the game content in inseparable relationship with the game program. Therefore, it is not expected to pick up and reproduce the sound data alone.

SUMMARY OF THE INVENTION

However, the digitized sound data themselves can be easily reproduced only if recording methods such as the sampling frequency, encoding bit number and compression of the data are known. Therefore, it becomes possible to read and reproduce only the digital sound data from the recording medium such as a CD-ROM by using a general-purpose computer. In such a situation, however, there is the possibility that the sound data may be copied alone and utilized for the reproduction of a music or the like against the will of a copy right owner of a game content or the like. Since the occurrence of such a situation is detrimental to the interests of the copyright owner, some protecting means or others is required.

An object of the present invention is to provide a technique for preventing the reproduction of digital sound data, which is recorded in a recording medium as a part of a content, separately from the content.

In order to solve the above-described problem, the present invention provides, as a first aspect thereof, a recording medium which is capable of being read out by an information processor and which records at least digital sound data and a program for controlling the reproduction of the digital sound data. The recording medium features that the digital sound data is encrypted and information required for decrypting the encrypted digital sound data is recorded in a program for controlling the reproduction of the digital sound data.

Further, the present invention also provides, as a second aspect thereof, an information processor which is capable of reading a recording medium having at least encrypted digital sound data and information required for decrypting the encrypted digital sound data recorded therein. The information processor features that it is provided with means operating such that when the information processor is requested to reproduce the encrypted digital sound data, it decrypts the encrypted digital sound data by referring to the information required for such decoding.

BRIEF DESCRIPTION OF THE DRAWINGS

FIG. 2 is a diagram illustrating a state in which the entertainment apparatus is used; and FIG. 3 is a diagram illustrating the data structure of a CD-ROM.

DETAILED DESCRIPTION OF THE INVENTION

Figure 1:
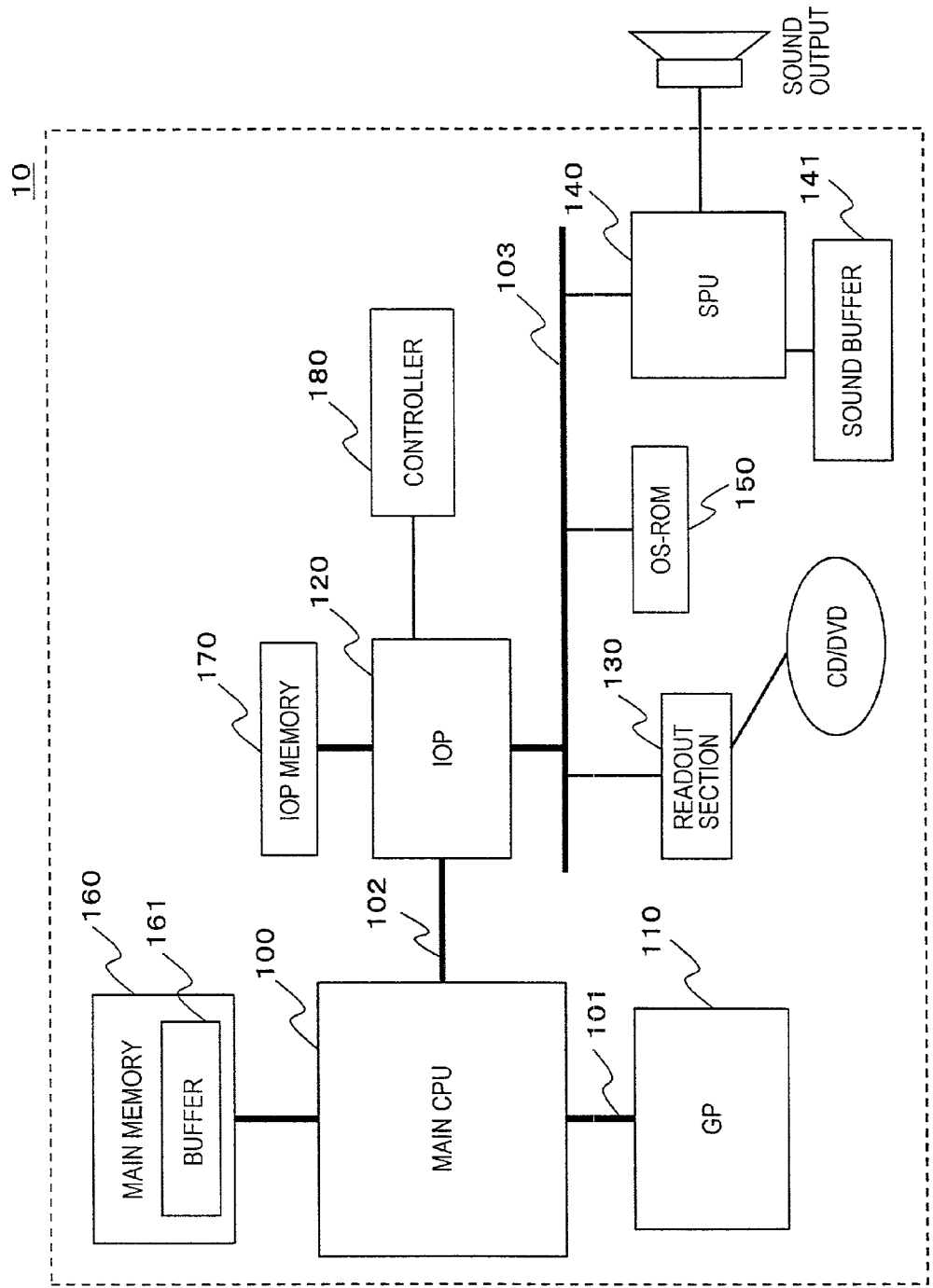
FIG. 1 is a block diagram of an entertainment apparatus used in the present invention.

The embodiments of the present invention will hereinafter be described with reference to the accompanying drawings.

The present invention can be applied to a case where digital sound data is recorded in a recording medium, especially an optical disk such as a CD-ROM, DVD-ROM or the like, which is capable of being read-out by an information processor such as an entertainment apparatus. The invention is of curse applicable to other recording medium such as an optical magnetic disk, a magnetic disk, a memory card a memory cartridge or the like.

The entertainment apparatus operates such that in the case of reproducing any digital sound data recorded in an optical disk, it controls, through software, the specifying, reading and analogizing processes on the digital sound data to be reproduced. This software is recorded as a part of a content to be provided by the optical disk having the digital sound data recorded therein.

FIG. 1 is a block diagram of an entertainment apparatus 10. The entertainment apparatus 10 is an example of an information processor which is capable of reproducing digital sound data to be supplied through a CD-ROM or DVD-ROM as a medium.

As shown in FIG. 1, the entertainment apparatus 10 is provided with a main CPU 100, a graphics processing unit (GP) 110, an I/O processing unit (IOP) 120, a CD/DVD readout section 130, a sound processing unit (SPU) 140, a sound buffer 141, an OS-ROM 150, a main memory 160 and an IOP memory 170.

The main CPU 100 and GP 110 are connected to each other through an exclusive bus 101 and the main CPU 100 and the IOP 120 are connected together through a bus 102. Further, the IOP 120, the CD/DVD readout section 130, the SPU 140 and the OS-ROM 150 are connected to a bus 103.

To the main CPU 100 connected is the main memory 160 and to the IOP 120 connected is the IOP memory 170. Further, to the IOP 120 connected is a controller 180.

The main CPU 100 performs a predetermined process by executing a program stored in the OS-ROM 150 or a program transferred to the main memory 160 from the CD/DVD-ROM or the like.

The GP 110 is an image-drawing processor taking charge of the rendering function of the entertainment apparatus and performs an image-depicting process in accordance with an instruction from the main CPU 100.

The IOP 120 is an input/output sub-processor for controlling the exchanges of data between the main CPU 100 and a peripheral device such as the CD/DVD readout section 130, the SPU 140, or the like.

The CD/DVD readout section 130 reads out data from the CD-ROM and DVD-ROM mounted on a CD/DVD drive and transfers the data to a buffer area 161 provided in the main memory 160.

The SPU 140 reproduces compressed wave-form data or the like stored in the sound buffer 141 at a predetermined sampling frequency in accordance with a sounding command from the main CPU 100 or the like.

The OS-ROM 150 is a non-volatile memory which stores therein a program or the like to be executed by the main CPU 100 and the IOP 120 on startup.

The main memory 160 is a main storage device of the main CPU 100 and stores commands to be executed, and data to be utilized, by the CPU 100. Further, in the main memory 160 there is provided the buffer area 161 where data read-out from the recording medium such as the CD-ROM, DVD-ROM or the like is temporarily stored.

The IOP memory 170 is a main storage device of the IOP 120 and stores therein commands to be executed by the IOP 120 and data to be utilized by the main CPU 100.

The controller (PAD) 180 is an interface which accepts instructions from an operator.

FIG. 2 is a diagram illustrating a state in which the entertainment apparatus 10 is used. In this figure, the controller 180 is connected to a connector 12 of the main body 11 of the entertainment apparatus 10. Further, to an image sound output terminal 13 of the main body 11 connected is one end of an image sound output cable 14. The other end of the cable 14 is connected with an image sound output device 15 such as a television receiver. The operator of the entertainment apparatus 10 gives an operating instruction by using the controller 180. The entertainment apparatus 10 receives the instruction from the operator through the controller 180 and outputs image data and sound data corresponding to this instruction, to the image sound output device 15, which latter outputs image and sound.

Described hereinafter are a process of recording digital sound data, which has been encrypted, in the CD-ROM readable by the entertainment apparatus 10 having the above-described configuration and a process of reproducing the digital sound data recorded in the CD-ROM by the entertainment apparatus.

First, the process of encrypting and recording the digital sound data in the CD-ROM will be described.

FIG. 3 illustrates the data structure of a CD-ROM 200 wherein the data is recorded according to the present invention. In this figure, the CD-ROM 200 has at least an area where a program section 210 is recorded and an area where a sound data 220 is recorded. The program 210 includes a sound data reproduction section 211. Further, the CD-ROM 200 may be provided with a multimedia data section including video data.

The sound data section 220 has one or a plurality of sound data files 221 having PCM data which have been encrypted at a sampling frequency of 48 KHz and encoded with 16 bits quantization. The PCM data may be recorded in a compressed form according to a method such as an ADPCM (adaptive differential PCM) which records a finite difference of data, for example per time unit.

The digital sound data is encrypted and recorded in the CD-ROM 200. It should be noted that in this case, the term "non-encrypted digital sound data" is called "original sound data" and the term "encrypted digital sound data" is called "encrypted sound data".

The method of encrypting is optional and any known method may be used. For example, it is possible to record original sound data by applying a reversible conversion by using a key code as a parameter with respect to the digital code for the original sound data.

Where a plurality of sound data files are recorded in the CD-ROM 200, a different encrypting method may be used for each voice data file. In this case, it is preferable, from the point of view of reduction of the load at the time of reproduction of sound data, to select a method with which decoding can be performed in a simple manner.

The program section 210 of the CD-ROM 200 records command data for controlling the entertainment apparatus. The command data is read in the main memory 160 and executed by the main CPU 100 so that a content such as game or multimedia or the like can proceed. It is noted that the program 210 may be recorded by being divided into a plurality of files.

In the sound data reproduction section 211 included in the program 210, there is recorded a command for reproducing the sound data file 221 which is recorded in the CD-ROM 200. That is, recorded is an order or the like for allowing the SPU 140 to produce sound, based on the sound data file 221 demanded to be reproduced.

In the sound data reproduction section 211, recorded are also a key code 215 and a decoding method 214 for reconstructing original sound data by decoding encrypted sound data. Further, where a plurality of sound data files 221 are recorded in the CD-ROM 200 and a different encrypting method is applied to each of the sound data files, information 213 associating the sound data file with a decoding method or the like is also recorded.

Thus, the decoding method 214 and the key code 215 for decoding are recorded separately from each of the sound data files 221 so that even when only each of the sound data files 221 is picked up, the reconstruction of the original sound data is extremely difficult. Further, the decoding method 214 and the key code 215 for decoding are recorded by being embedded within the program section 210. The program section 210 includes an extremely large amount of data so that it is difficult to find out the key code 215 or the like from among the data.

Next, described will be a process to be performed where the encrypted sound data recorded in the CD-ROM 200 is reproduced by the entertainment apparatus.

When the main CPU 100 of the entertainment apparatus 10 having the CD-ROM 200 mounted therein is requested to reproduce the encrypted sound data, it performs the following process in accordance with command data recorded in the sound data reproduction section 211.

First, a key code for decoding the encrypted sound data which have been requested to be reproduced is stored in the IOP memory 170. This key code is one that corresponds to the sound data file 221 as a target object for reproduction. The main CPU 100 extracts the key code by referring to information associating the sound data file 213 with the key code 215.

The main CPU 100 transfers the encrypted sound data in the sound data file 221 recorded in the CD-ROM through the CD/DVD readout section 130 to the buffer 161 of the main memory 160 in sequence so as to store them temporarily and then transfers the data to the IOP memory 170. The main CPU 100 performs an operation on the encrypted sound data transferred to the IOP memory 170 by using the key code stored in the IOP memory 170 in accordance with a predetermined decoding method recorded in the sound data reproduction section 211. Then the original sound data is reconstructed in the IOP memory 170. Such predetermined reconstruction method can be a simple technique with a reduced calculation load.

Then, the SPU 140 performs a D/A conversion with respect to the original sound data so as to generate analog sound data and to output it from an image sound output terminal 13.

Thus, according to the present invention, it is possible to reproduce digital sound data included in a content by an information processor which is capable of executing the program included in the content. Therefore, it is difficult to reproduce the digital sound data alone by picking up the digital sound data from the content. Further, it is also possible to reduce the calculation load at the time of sound reproduction irrespective of the fact that the sound data is encrypted and recorded.

As described above, according to the present invention, it is possible to prevent the digital sound data recorded in the recording medium as a part of the content, from being reproduced separately from the content.

What is claimed is:

1. A recording medium readable by an information processor, having at least digital sound data and a program for controlling the reproduction of the digital sound data separately recorded therein, wherein:

the digital sound data is encrypted; and a decrypting method and key information for decrypting the encrypted digital sound data are recorded in the program for controlling the reproduction of the digital sound data.

2. A recording medium readable by an information processor, comprising:

an area where encrypted digital sound data is recorded; and an area where a program for controlling operation of the information processor is recorded; wherein a decrypting method and key information for decrypting the encrypted digital sound data are recorded in the program for controlling the reproduction of the digital sound data.

3. A recording medium readable by an information processor, comprising:

an area where encrypted digital sound data is recorded; and an area where a program for controlling operation of the information processor is recorded;

wherein a decrypting method and key information for decrypting the encrypted digital sound data are recorded in the program for controlling the reproduction of the digital sound data; and wherein the area where encrypted digital sound data are recorded records a plurality of digital sound data encrypted by a plurality of encrypting methods, and a plurality of decrypting methods and key information are recorded for the plurality of recorded digital sound data.

4. A recording medium readable by an information processor, comprising:

an area where encrypted digital sound data is recorded; and an area where a program for controlling operation of the information processor is recorded;

wherein a decrypting method and key information for decrypting the encrypted digital sound data are recorded in the program for controlling the reproduction of the digital sound data; and wherein the encrypted digital sound data are recorded by a plurality of digital sound data encrypted by a plurality of encrypting methods, and a plurality of decrypting methods and the key information are recorded for the plurality of recorded digital sound data.

* * * * *